United States Patent
Wipliez et al.

(10) Patent No.: US 7,079,526 B1
(45) Date of Patent: Jul. 18, 2006

(54) PROTOCOL FOR LAUNCHING A SOFTWARE APPLICATION REMOTELY AND FOR RESERVING NETWORK RESOURCES WITH QUALITY OF SERVICE

(75) Inventors: Christian Wipliez, Lannion (FR); Stéphane Statiotis, Tregastel (FR); Michel Bourbao, Tregastel (FR); David Farcy, Juille (FR)

(73) Assignee: France Telecom, Paris (FR)

( * ) Notice: Subject to any disclaimer, the term of this patent is extended or adjusted under 35 U.S.C. 154(b) by 1089 days.

(21) Appl. No.: 09/857,339

(22) PCT Filed: Oct. 2, 2000

(86) PCT No.: PCT/FR00/02725

§ 371 (c)(1),
(2), (4) Date: Jul. 16, 2001

(87) PCT Pub. No.: WO01/26301

PCT Pub. Date: Apr. 12, 2001

(30) Foreign Application Priority Data

Oct. 4, 1999   (FR) .................................. 99 12352

(51) Int. Cl.
*H04L 12/56* (2006.01)
(52) U.S. Cl. ...................... 370/352; 370/252; 709/203; 379/88.17
(58) Field of Classification Search ........ 370/352–356, 370/400, 401, 386, 389, 392; 379/88.17; 709/203, 226
See application file for complete search history.

(56) References Cited

U.S. PATENT DOCUMENTS 6,751,221 B1 * 6/2004 Saito et al. ................. 370/392
6,831,915 B1 * 12/2004 Beyschlag et al. .......... 370/352

FOREIGN PATENT DOCUMENTS

EP   0 661 626   7/1995
WO   WO98/58474   12/1998

OTHER PUBLICATIONS

Lazar, AA, "Programming Telecommunication Networks", IEEE Network/The Magazine of Computer Communications, US, IEEE, Inc, New York, vol. 11, No. 5, (Sep. 1, 1997).

* cited by examiner

*Primary Examiner*—John Pezzlo
(74) *Attorney, Agent, or Firm*—Gardner Carton & Douglas LLP

(57) ABSTRACT

The invention concerns a protocol for remote launching of a software application and reserving network resources with quality of service between a caller terminal TA and a called terminal TB. Said protocol consists in: transmitting (A) from the caller terminal to the called terminal TB a reservation request for connection via a server and a transmission via an unconnected network and in establishing (B) between the caller terminal TA and the called terminal TB, a procedure for reserving network resources with quality of service by exchange of messages by transmission via the unconnected network. When the network resources reservation is accepted by the server, a connected network between the caller terminal and the called terminal is established (C) on the same physical network supporting the unconnected network via a control network RC. The connected network forms the network resource with quality of service for executing the remote software application between the caller terminal TA and the called terminal TB. The invention is applicable to a connected network, ATM network, and to an unconnected network, IP network.

7 Claims, 3 Drawing Sheets

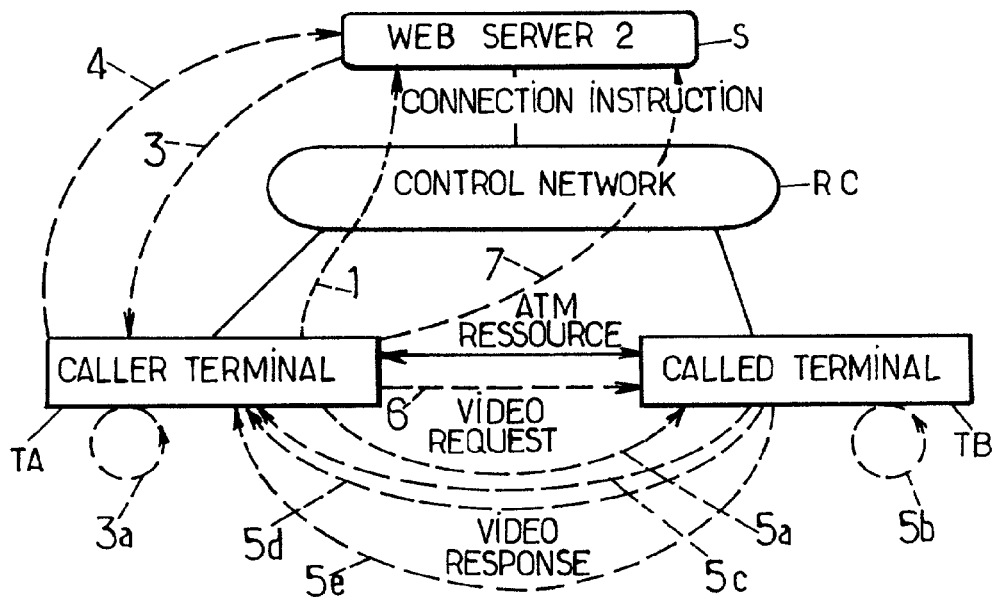
FIG.2.
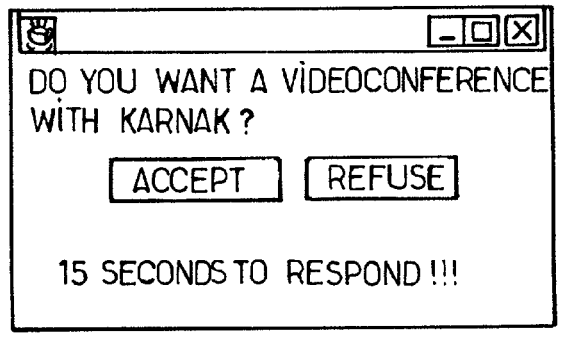
FIG.3a.
ATM RESERVATION
FIG.3b.
CALLED TERMINAL
DIALOGUE BOX

PROTOCOL FOR LAUNCHING A SOFTWARE APPLICATION REMOTELY AND FOR RESERVING NETWORK RESOURCES WITH QUALITY OF SERVICE

With the introduction of exchange of information of all kinds via transmission networks, configuring, occupying and using networks rationally, with a view to assuring transmission of the information under satisfactory conditions, has become a serious problem.

As a general rule, information can be transmitted via such networks in connected mode or in unconnected mode.

During transmission in connected mode, a caller entity cannot send information to a called entity without first asking the latter entity for permission to transmit it blocks of information. The process of transmission in connected mode therefore entails setting up the connection, succession of multiple connections, exchanging blocks of information and then clearing down the connection. This is the case, for example, in communication via a public switched telephone network (PSTN) or via an integrated services digital network (ISDN).

During transmission in unconnected mode, information is transmitted by routing it to a distant entity that may be in an active or non-active state. If the entity is in the non-active state, it is replaced by a mailbox. For this kind of transmission mode, the characteristics of the blocks of data transmitted must be known, and for each transmission it is necessary to specify control information that is necessary for the data transmitted, and the information conveyed by the data, to reach its destination. In particular, the addresses of the distant receiving entity and the sending entity must be inserted into the block of data transmitted for this purpose. This is the case in particular when transmitting electronic mail, files and applications for which real-time communication is not necessary.

At present, publications on the subject of programming and configuring connected networks have been essentially concerned with the processes of programming and of configuration with signaling. In particular, these processes with signaling essentially consist of transporting connection commands, also referred to as signaling, via a signaling network referred to as the common channel signaling network.

More recently, the Universities of Kansas and of Columbia (N.Y.) in the United States of America have published the results of research relating to the reservation of bandwidth in a transmission network using the Generic Switch Management Protocol (GSMP) to reserve resources.

The aforementioned research results include the following papers:

1) J. F. HUARD, A. A. LAZAR, K. S. LIM and G. S. TSELIKIS, "*Realizing the MPEG-4 Multimedia Delivery Framework*", IEEE Network Magazine pp. 35–45, November/December 1998. Special Issue on Transmission and Distribution of Digital Video.

2) J. F. HUARD and A. A. LAZAR, "*A Programmable Transport Architecture with QUOS Guarantee*", IEEE Communications Magazine, Vol. 36, No. 10, pp. 54–62, October 1998.

3) J. BISWAS, A. A. LAZAR, J. F. HUARD, K. S. LIM, S. MAHJOUB, L. F. PAJ, M. SUZUKI, S. TORTENSSON, W. WANG and S. WEINSTEIN, "*The IEEE p. 1520 Standards Initiative for Programmable Network Interfaces*", IEEE Communications Magazine, Vo. 36, No. 10, pp. 64–70, October 1998.

4) A. A. LAZAR, "*Programming Telecommunication Networks*", IEEE Network Magazine pp. 8–18, September/October 1997.

Papers on procedures for requesting the setting up of a connection via a network by means of a web browser include:

5) GÖTA LEIJONHUFVUD, Ericsson Telecom AB, "*Session Control for Broadband Multimedia Services using the HTTP Protocol*", ATM Forum, February 1997.

Finally, the Remote Method Invocation (RMI) and HyperText Mark-up Language (HTML) procedures are used in the JAVA environment for launching applications in a client-server architecture on a unconnected network.

The procedures previously mentioned are satisfactory, but they have to use the same network to transmit the streams of information of the application. For example, in the aforementioned procedures there is no means of indicating to the network the value and the type of quality of service required. Also, in the aforementioned procedures, there is obviously no coupling to assure the launching of a connected network connection, or even more so of an application, the connected network being separate from and independent of the unconnected network.

An object of the present invention is to remedy the disadvantages and limitations of the prior art procedures by providing a protocol for launching a software application remotely and for reserving network resources with quality of service so that a caller terminal is able to launch an application remotely on a called terminal when the terminals are connected to a connected network.

Another object of the present invention is to provide a protocol for launching a software application remotely and reserving network resources with quality of service in which, before actually launching the application, the caller terminal has made connections from a unconnected network by means of a reservation procedure.

A further object of the present invention is to provide a protocol enabling communication with a guaranteed bit rate and quality of service on the connected network, after the connected network has made the connection between the caller terminal and the called terminal.

A final object of the present invention is to provide a protocol for launching a software application remotely and reserving network resources with quality of service more particularly intended for managing videophone calls from the same integrated system at the level of the caller terminal.

The protocol in accordance with the present invention for launching a software application remotely and reserving network resources with quality of service, between a caller terminal and a called terminal, is characterized in that it consists of transmitting a connection reservation request from the caller terminal to the called terminal via a server and a unconnected network and setting up between the caller terminal and the called terminal a process of reservation of network resources with quality of service by exchanging messages by transmission via the unconnected network. On acceptance of the reservation of network resources by the server, a connected network is set up between the caller terminal and the called terminal on the same physical network supporting the unconnected network and by means of a control network. The connected network constitutes the network resource with quality of service for executing the software application remotely between the caller terminal and the called terminal.

The protocol in accordance with the present invention is intended for remote use of software applications of all types with reservation of quality of service, but is more particularly intended for videoconference applications for which managing the occupation of the bandwidth of the networks connected during its execution is of primordial importance.

To facilitate an understanding of the invention, the protocol according to the invention will now be explained in the following description, which is given with reference to the drawings, in which.

FIG. 2 shows by way of illustrative example a detail of a preferred embodiment of the protocol in accordance with the present invention, in which connection reservation request and reservation process messages are established in a JAVA environment; and FIGS. 3a and 3b respectively show screen pages displayed by the monitors of the caller terminal and the called terminal in the case of a videoconference application.

The protocol in accordance with the present invention for launching a software application remotely and reserving network resources with quality of service will now be described with reference to FIG. 1a and the subsequent figures.

As a general rule, the protocol in accordance with the present invention is intended to be used between a caller terminal TA and a called terminal TB. Of course, the caller terminal and the called terminal are equipped with the necessary resources for exchanging information messages in the form of files and preferably in the form of screen pages enabling interactive dialogue between the caller terminal TA and the called terminal TB.

Figure 1A:
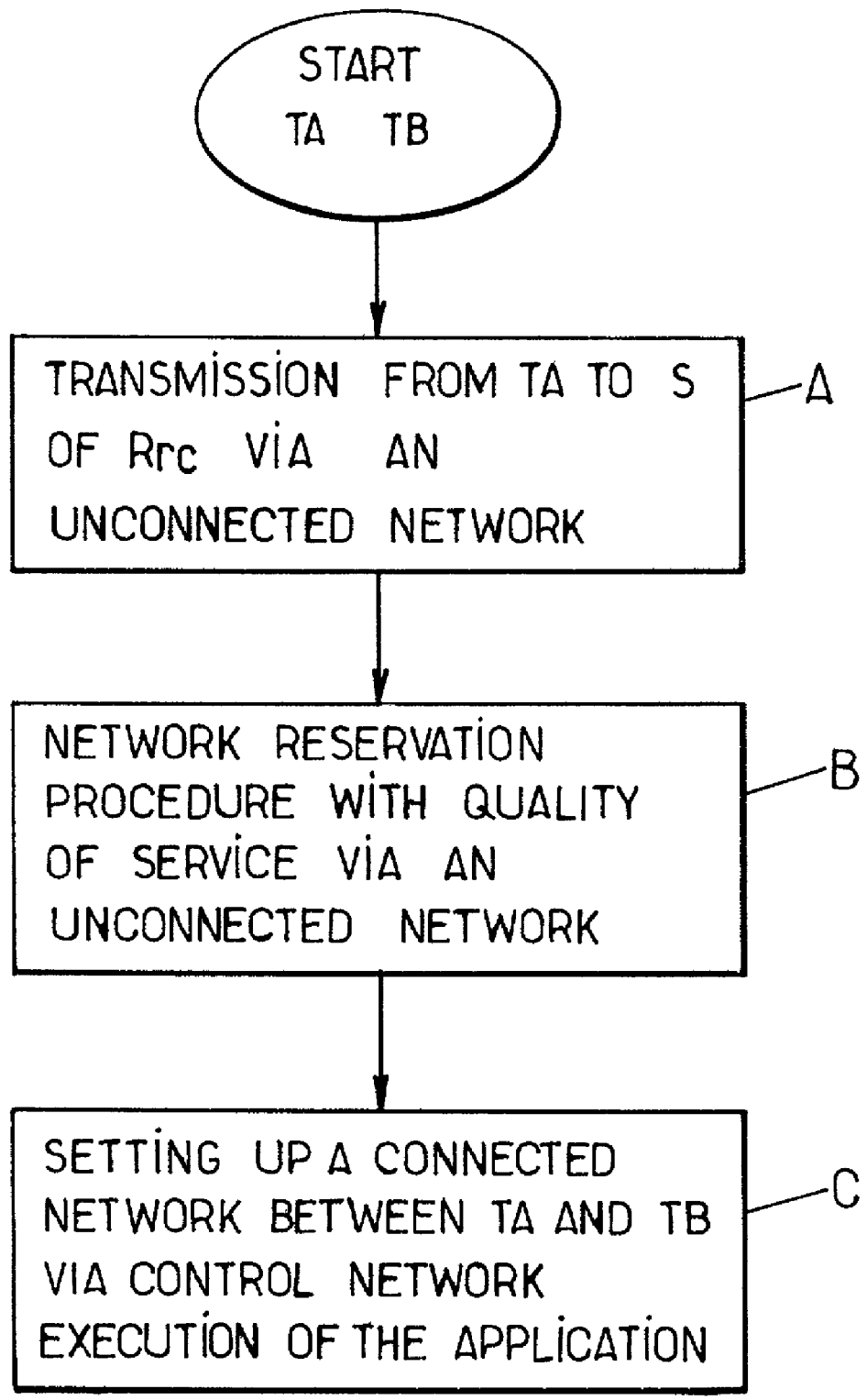
FIG. 1a is a flowchart showing steps of the protocol in accordance with the present invention.

Referring to FIG. 1a, following a start step in which the caller terminal TA and the called terminal TB are necessarily physically interconnected to a network able to set up communication between them, the called terminal TB being functionally independent of the caller terminal TA, the protocol in accordance with the present invention consists, in step A, of transmitting from the caller terminal TA to the called terminal TB a connection reservation request $R_{rc}$ which is transmitted by means of a server S and via a unconnected network. Transmission of the request via a unconnected network implies the transmission conditions previously mentioned in the description relating to the transmission of data or information messages over the unconnected network.

After the aforementioned step A, step B of the protocol in accordance with the present invention consists of setting up between the caller terminal TA and the called terminal TB a process of reserving network resources with quality of service. As a general rule, this reservation process enables the user of the terminal TA to define certain parameters relating to the network resources with quality of service, as will be explained later in the description.

In accordance with one remarkable aspect of the protocol in accordance with the present invention, the reservation process is set up by exchanging messages via the server and transmission via the unconnected network previously referred to in relation to step A.

On acceptance of the reservation of network resources by the server, the aforementioned called terminal or its user being in a position to accept execution of the application, step C of the protocol in accordance with the present invention consists of setting up a connected network between the caller terminal TA and the called terminal TB, preferably on the same physical network supporting the unconnected network, and via a control network RC. When the connected network has been set up, the transmission of information messages between the caller terminal TA and the called terminal TB satisfies the conditions previously referred in the description relating to the transmission of information messages over a connected network.

The connected network therefore constitutes the network resource with quality of service enabling execution of the software application remotely between the caller terminal and the called terminal.

As a general rule, to use the protocol in accordance with the present invention it is necessary for the connected network intended to transport the streams of information with quality of service to be controlled externally, the concept of external control covering both the use of a control network, here the network RC, to configure the successive connections of the connected network or, where applicable, a translation system for messages transmitted by the unconnected network in order to reserve resources and existing signaling as previously defined in the description.

Various specific embodiments will now be described with reference to FIGS. 1b and 1c, with the aim of defining respective preferred architectures of connected network systems and unconnected network systems used to execute the protocol in accordance with the present invention for launching a software application remotely and reserving network resources with quality of service.

Figure 1B:
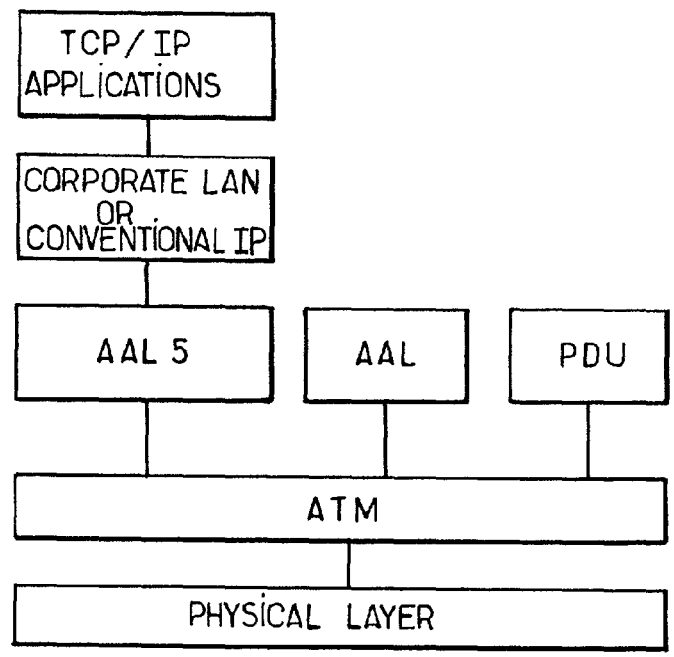
FIG. 1b shows one particular preferred embodiment of the protocol in accordance with the present invention in the case in which the unconnected network is an Internet Protocol (IP) network and the connected network is an ATM network.

As a general rule, the steps consisting of transmitting the connection reservation request $R_{rc}$ and setting up between the caller terminal and the called terminal a process for reserving network resources with quality of service are preferably executed from the server (see FIG. 1b).

Figure 1C:
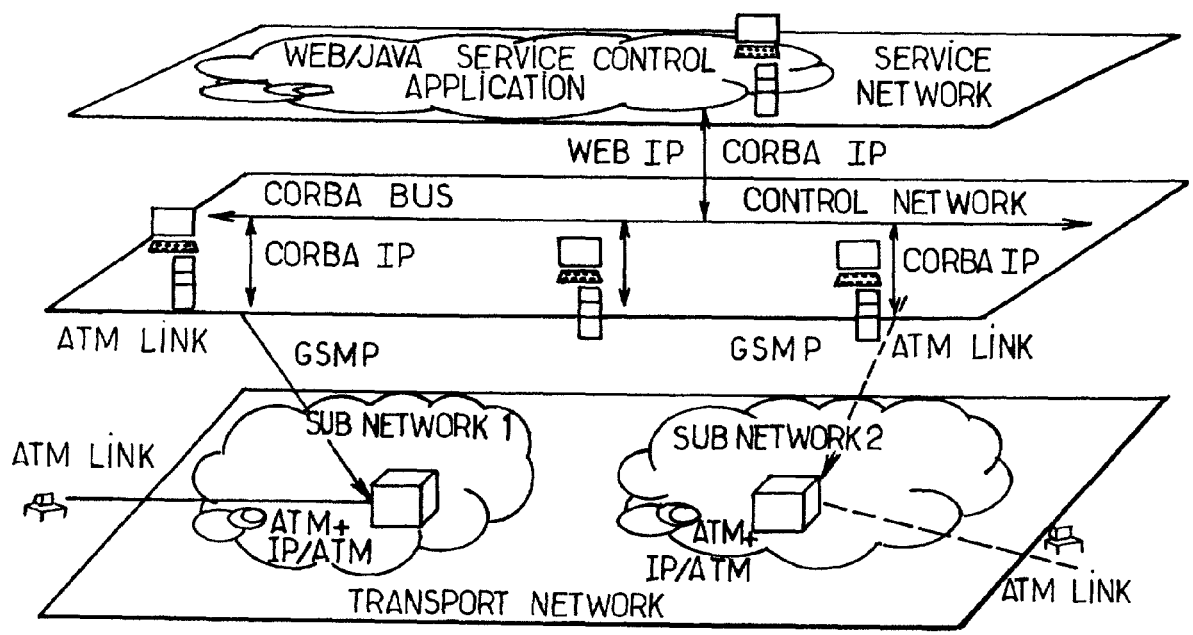
FIG. 1c shows by way of illustrative example the relative architecture of the connected and unconnected networks of the FIG. 1b embodiment.

Similarly, it is particularly advantageous if the server is a web server (see FIG. 1c). In this case, the steps of transmitting the connection reservation request and setting up between the caller terminal TA and the called terminal TB a process for reserving network resources with quality of service can then consist of sending HyperText Mark-up Language (HTML) messages.

Referring to FIGS. 1b and 1c, in this preferred embodiment the protocol in accordance with the present invention controls links of an ATM network from an IP network. The ATM network constitutes the connected network and the IP network constitutes the unconnected network.

As shown in FIG. 1b, in order to transport the streams of information with quality of service or, where applicable, to have access to two protocol stacks on the same ATM interconnection card, the caller terminal TA and the called terminal TB naturally have an IP network interface card and an ATM network interface card.

In this case the IP unconnected network and the ATM connected network both use the same physical medium. In particular, the IP applications, i.e. the HTML or like messages, are transported by emulating a Local Area Network (LAN) and the ATM messages can be transmitted in the machine directly or after the adaptation layer AAL.

Accordingly, the two protocol stacks are supported by the same physical medium (see FIG. 1b).

Referring to FIG. 1c, when the connection to a server, in particular a web server, is set up from the caller terminal TA, dialogue can be established between the aforementioned caller terminal and the server using the HTTP protocol of a web browser to transfer messages and where applicable programs, execution subroutines, as will be explained later in the description. The server can then launch connection instructions, as shown in FIG. 1c, the connection instructions to a control network being launched by means of a CORBA IP protocol, the control network including a CORBA BUS to stations generating ATM links. As shown in FIG. 1c, and without being limiting on the invention, the ATM network is configured from a distributed programming platform, although any other solution is feasible, such as signaling by a third party agent.

As shown in FIG. 1c, to make the connections on the ATM network, i.e. to configure the connected network as shown in the figure, the protocol used between the previously mentioned control network RC and the ATM network, in fact constituting the network for conveying the application with quality of service, can be a Generic Switch Management Protocol (GSMP).

Thus the connected network constituting the aforementioned transport network can take the form of various sub-networks, here, and by way of non-limiting example, sub-networks 1 and 2, the ATM links between the caller terminal TA and the called terminal TB of course enabling interconnection of the latter at any location.

A more detailed description of one specific embodiment of the protocol in accordance with the present invention will now be given with reference to FIG. 2, in the situation where the unconnected network is an IP network and the server is a web server, for example.

As shown in the aforementioned figure, the steps of transmitting the connection reservation request and setting up the process for reserving network resources with quality of service, i.e. steps A and B shown in FIG. 1a, can consist at least of: 1) transmitting from the caller terminal TA to the web server a connection request and, upon connection of the caller terminal TA to the aforementioned server, 2) supplying the caller terminal TA with an entry page. Supplying an entry page to the caller terminal TA is not shown in detail in FIG. 2 because this is a standard operation performed when a terminal accesses a server in accordance with the IP network transmission protocol.

Following supply of the entry page, the protocol in accordance with the present invention includes a step 3) in which the caller terminal downloads a subroutine for selecting quality of service parameters into its memories from the server, and in particular from the web server. The caller terminal will therefore be in a position, using this subroutine, to guide the user of the caller terminal through the selection of parameters for transmitting information relating to the application to be executed.

The aforementioned step 3) is then followed by a step 3a), executed in the caller terminal TA and shown by a closed loop arrow, consisting of establishing a choice of quality of service parameters from the aforementioned caller terminal and the selection subroutine.

The aforementioned steps 3) and 3a) are then followed by a step 4) consisting of transmitting the chosen quality of service parameters from the caller terminal TA to the web server, after entering the required communication and quality of service parameters.

After step 4), it is then possible, using the chosen quality of service parameters, to set up the reservation of connected network resources constituting the network resources with quality of service previously referred to in the description. The aforementioned reservation of resources is set up from the web server, via the control network RC, to the ATM network previously described with reference to FIGS. 1b and 1c.

Accordingly, at the end of step 4), the control network RC sets up reservation of resources on the ATM network between the caller terminal TA and the called terminal TB.

After setting up reservation of connected network resources, a step 5a) of the protocol in accordance with the present invention can advantageously consist of transmitting from the caller terminal TA to the called terminal TB an application execution request including at least one code identifying the caller terminal TA. Of course, the application execution request can then be transmitted on the unconnected network, even though the reservation of connected network resources has actually been done and the connected network has therefore been set up. As a general rule, the application execution request includes at least one code identifying the caller terminal TA. After the aforementioned step 5a), a step 5b) of the protocol in accordance with the present invention consists of setting up in the called terminal TB a process of managing the application execution request. For this reason, the management process of step 5b) is represented by a closed loop in the terminal TB in FIG. 2.

In one particular and non-limiting preferred embodiment, the management process shown in step 5b) can advantageously include a step of transmitting via the unconnected circuit to the caller terminal TA an application execution request rejection message and prompting the caller terminal TA to clear down the connection reservation if the called terminal TB refuses the application execution request. FIG. 2 shows the step 5c) of transmitting the execution request rejection message.

On the other hand, on acceptance by the called terminal TB of the execution request, a step of transmitting an application execution request acceptance and application start-up message to the caller terminal via the unconnected circuit is executed. FIG. 2 shows the aforementioned step 5d) of transmitting an application execution request acceptance message.

On the other hand, if there is no response from the called terminal TB during a predetermined time period, i.e. no response to the application execution request, a step 5e) of the protocol in accordance with the present invention consists of transmitting a message indicating the absence of the called terminal TB to the caller terminal TA, after the aforementioned predetermined time period and via the connected circuit. As a general rule, and as shown in FIG. 2, steps 5c), 5d) and 5e) are globally designated "video response", the term "video" referring generically to an application dedicated to videoconferencing, as will be explained later in the description.

Where the connection reservation request and the quality of service parameter selection subroutine are concerned, the protocol in accordance with the present invention for launching a software application remotely and reserving network resources with quality of service can be implemented by means of subroutines usually referred to as applets in the JAVA environment.

In this case, the step of downloading a quality of service parameter selection subroutine into the caller terminal from the server can advantageously consist in loading a JAVA applet.

Finally, at the end of execution of the application, i.e. at the end of transmission of information messages via the ATM network, the caller terminal TA and the called terminal TB terminate their application locally in a similar manner to terminating a conventional telephone call, for example, or an ISDN call.

Following termination of the call, the caller terminal TA, which set up the connection, is then prompted to perform a disconnection operation which in fact clears down the resources of the aforementioned web server of the ATM network, in step 7). The overall control process is therefore finished, the ATM network being totally cleared down and ready for subsequent reconfiguration.

A more detailed description will now be given with reference to FIGS. 3a and 3b of specific elements of the protocol in accordance with the present invention when the application is dedicated to a videoconference application.

In this kind of situation, the video information relating to the videoconference is transmitted via the ATM network and, to this end, the quality of service parameter selection subroutine consisting of a JAVA applet provides a choice of subscriber, bandwidth and multicast parameters. The Remote Method Invocation (RMI) mechanism developed by JAVASOFT is the preferred way to implement and transmit JAVA applets, as the Remote Procedure Code (RPC) protocol used in distributed object systems is unsuitable. The objectives of the RMI mechanism are:

to support remote invocation of JAVA objects,
to integrate the distributed object model into the JAVA environment naturally, retaining the object-oriented semantics of the language,
to simplify the development of distributed applications, and
to preserve the security and reliability of the aforementioned JAVA environment.

The aforementioned RMI mechanism calls upon client/server concepts which are valid for a call. The RMI mechanism in fact remotely invokes a JAVA object, which satisfies two of the three critical points previously mentioned, namely:

the dependence on the implementation of the mechanism, the RMI mechanism in fact using the IP address to locate the remote RMI server, and
a videoconference service additionally imposes on the caller terminal TA and the called terminal TB the conditions that the called terminal TB is powered up and connected and that a RMI server exists as a background task on each of the aforementioned terminals.

During a call, the caller terminal TA is a RMI client and server at the same time and the called terminal TB is a RMI server, even if the code is the same on each of the aforementioned terminals. In this case, the aforementioned videoconference service is therefore not completely independent of the terminal, but it has the advantage of being secure because the only possible actions at each remote terminal are those defined in the server-end interface.

However, to implement the aforementioned videoconference service it is still necessary to warn the called terminal TB of the application execution request previously mentioned in the description.

In the context of using the protocol in accordance with the present invention in the JAVA environment, a satisfactory solution consists of introducing a remotely invoked JAVA dialogue box at the called terminal.

In this case, the same encrypted references corresponding to the steps of the protocol in accordance with the invention as shown in FIG. 2 now dedicated to a video conference application, the corresponding successive steps are as follows:

1) The caller terminal TA connects to the web resource server.
2) The server supplies an HTML page to the caller terminal TA. The web server contains the information necessary for the service. It defines the correspondence between the name and the IP address of the caller terminal TA, in a similar manner to electronic mail broadcast lists.
3) The caller terminal TA downloads the JAVA applet for choosing the call parameters such as subscriber B, bandwidth, multicast as mentioned previously, although this list is not limiting on the invention. As shown in FIG. 3a, the aforementioned JAVA applet includes a screen page displayed on the caller terminal TA and including at least two selector buttons, namely a "CONNECT/DISCONNECT" selector button and a button for varying the required bit rate for the transmission of videoconference data. The other parameters can be used for external control. The button for varying the bit rate is labeled "BIT RATE (kbit/s)" in FIG. 3a.

It is particularly advantageous if the "CONNECT/DISCONNECT" selector button is a soft button. In accordance with one particularly advantageous aspect of the invention, following reservation of network resources with quality of service, the "CONNECT" selector button is assigned the function of synchronizing external control of the network with launching the videoconference application. This mode of operation synchronizes external control of the network with launching the videoconference application as such because it avoids launching the aforementioned application before reserving ATM network resources, without which the application is unable to function, of course.

4) Pressing the "CONNECT" button in step 4) triggers the return of the connection set-up instruction to the web server. In this case, the web server forwards the reservation instruction to the control network RC which sets up ATM resource reservation between the caller terminal TA and the called terminal TB by allocating a virtual path (VP) and a virtual channel (VC) for each terminal after computing the routing operation. In the aforementioned example described with reference to FIG. 1c, network management is distributed by means of the CORBA protocol in order to control more effectively the switches providing the connection to constitute the connected network.

5a) During the step concerned, the aforementioned JAVA applet further includes a screen page displayed on the called terminal TB. The screen page includes two buttons, namely an "ACCEPT" button to accept launching of the application and a "REFUSE" button to refuse launching of the application. The action performed in the aforementioned step 5a) therefore puts the caller terminal on hold, with a "Call in progress" type message, and in this way warns the called terminal TB of a videoconference request by means of a dialogue box, where appropriate combined with a ringer signal, the dialogue box indicating the identity of the caller. In FIG. 3b, "VIDEO" refers generically to the videoconference application and "Karnak" designates an arbitrary caller terminal identifier. As shown in FIG. 3b, the aforementioned dialogue box can advantageously consist of a JAVA application which is launched by means of the aforementioned RMI mechanism and therefore enables the called terminal TB to respond to the caller terminal TA in accordance with its decision. Of course, in this case, the decision is taken by the user of the called terminal TB. Acceptance or refusal can then be managed in accordance with various choices using the two buttons previously mentioned in connection with FIG. 3b, namely the "ACCEPT" and "REFUSE" buttons. The user of the called terminal can therefore perform the following actions:

a) He can refuse the requested videoconference by pressing the "REFUSE" button, the effect of which is to return a code indicating to the caller that the other party does not want the videoconference and that the user of the caller terminal TA is responsible for clearing down the resources previously reserved. This is step 5c) in FIG. 2.

b) The called terminal can accept the requested videoconference by pressing the "ACCEPT" button, the corresponding return code being sent back and the videoconference applications then being launched simultaneously on the two terminals, namely the caller terminal and the called terminal, by means of the RMI mechanism. This is step 5d) in FIG. 2.

c) The called terminal TB is connected, but does not answer before the end of a "time-out" module whose duration can be set at 15 to 20 seconds, for example. In this case, the absence of the user of the called terminal TB is indicated to the caller terminal TA. The aforementioned time-out can advantageously be started at the called terminal TB when the JAVA dialogue box is launched. This is step 5e) in FIG. 2.

6) At the end of the call, i.e. at the end of the videoconference application, the users of the called [sic] terminal TA and the called terminal TB terminate their application locally, as with the telephone, for example. The caller terminal which set up the connection must then terminate it by pressing the "DISCONNECT" button.

The user of the caller terminal TA pressing the "DISCONNECT" button, whose function has not been re-assigned, after the end of the videoconference and the end of the call then clears down the resources. The disconnection mechanism can then be similar to the connection mechanism, but with the instruction to clear down the resources rather than reserve them.

The invention claimed is:

1. A protocol for launching a software application remotely and reserving network resources with quality of service, between a caller terminal and a called terminal, said protocol consisting in:
   transmitting a connection reservation request from said caller terminal to said called terminal via a server and an unconnected network,
   setting up between said caller terminal and said called terminal a process of reservation of network resources with quality of service by exchanging messages by transmission via said unconnected network, said steps of transmitting the connection reservation request and setting up said process of reserving network resources with quality of service consisting of at least:
   transmitting a connection request from said caller terminal to said server and, on connection of said caller terminal to said server:
   supplying an entry page to said caller terminal,
   loading a subroutine for selecting quality of service parameters into said caller terminal from said server,
   establishing a choice of quality of service parameters from said caller terminal and said selection subroutine,
   transmitting said choice of quality of service parameters from said caller terminal to said server, and
   based on the choice of quality of service parameters, setting up the process of reserving connected network resources constituting the network resources with quality of service;
   and, on acceptance of said reservation of network resources by said server,
   setting up a connected network between said caller terminal and said called terminal on the same physical network supporting said unconnected network and by means of a control network, said connected network constituting said network resource with quality of service for executing said software application remotely between said caller terminal and said called terminal.

2. The protocol according to claim 1, wherein said server consisting of a web server, said steps consisting of transmitting the connection reservation request and setting up between said caller terminal and said called terminal a process of reserving network resources with quality of service consist of sending messages.

3. A protocol for launching a software application remotely and reserving network resources with quality of service, between a caller terminal and a called terminal, said protocol consisting in:
   transmitting a connection reservation request from said caller terminal to said called terminal via a server and an unconnected network,
   setting up between said caller terminal and said called terminal a process of reservation of network resources with quality of service by exchanging messages by transmission via said unconnected network and, on acceptance of said reservation of network resources by said server,
   transmitting from said caller terminal to said called terminal an application execution request including at least one code identifying the caller terminal,
   setting up in said called terminal a management process for managing the application execution request; said management process including:
   on refusal of the application execution request by said called terminal, a step of transmitting an application execution request rejection message prompting said caller terminal to clear down said connection reservation to said calling terminal via said unconnected circuit,
   on acceptance of the execution request by said called terminal, a step of transmitting an application execution request acceptance and application launching message to said caller terminal via said unconnected circuit, and
   after a predetermined time period in which there is no response from said called terminal, a step of transmitting a called terminal absence message to said caller terminal via said unconnected circuit; and
   setting up a connected network between said caller terminal and said called terminal on the same physical network supporting said unconnected network and by means of a control network, said connected network constituting said network resource with quality of service for executing said software application remotely between said caller terminal and said called terminal.

4. A protocol for launching a software application remotely and reserving network resources with quality of service, between a caller terminal and a called terminal, said protocol consisting in:
   transmitting a connection reservation request from said caller terminal to said called terminal via a server and an unconnected network,
   setting up between said caller terminal and said called terminal a process of reservation of network resources with quality of service by exchanging messages by transmission via said unconnected network, the connection reservation request and the quality of service selection being JAVA applets and for a software application consisting of a videoconference session transmitted via the ATM network, said quality of service selection consisting of a JAVA applet choosing subscriber, bandwidth, and multicast parameters, and, on acceptance of said reservation of network resources by said server;

setting up a connected network between said caller terminal and said called terminal on the same physical network supporting said unconnected network and by means of a control network, said connected network constituting said network resource with quality of service for executing said software application remotely between said caller terminal and said called terminal.

5. The protocol according to claim 4, wherein said JAVA applet includes a screen page displayed on the caller terminal and including at least two selector buttons, namely a "CONNECT/DISCONNECT" selector button and a button for varying the transmission bit rate.

6. The protocol according to claim 5, wherein said "CONNECT/DISCONNECT" selector button is a button whose function can be re-assigned, the "CONNECT" selector button being assigned the function of synchronizing external control of of the network and launching of the videoconference application after the reservation of network resources with quality of service.

7. The protocol according to claim 5, wherein said JAVA applet further includes a screen page displayed on said called terminal and including two buttons, namely a button for accepting launching of the application and a button for refusing launching of the application.

* * * * *